(12) United States Patent
Cheng

(10) Patent No.: US 9,563,551 B2
(45) Date of Patent: Feb. 7, 2017

(54) DATA STORAGE DEVICE AND DATA FETCHING METHOD FOR FLASH MEMORY

(71) Applicant: Silicon Motion, Inc., Jhubei, Hsinchu County (TW)

(72) Inventor: Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 65 days.

(21) Appl. No.: 14/302,692

(22) Filed: Jun. 12, 2014

(65) Prior Publication Data

US 2014/0379964 A1 Dec. 25, 2014

Related U.S. Application Data

(60) Provisional application No. 61/837,515, filed on Jun. 20, 2013.

(30) Foreign Application Priority Data

May 21, 2014 (TW) .............................. 103117734 A

(51) Int. Cl.
*G06F 12/00* (2006.01)
*G06F 12/02* (2006.01)

(52) U.S. Cl.
CPC ... *G06F 12/0246* (2013.01); *G06F 2212/7201* (2013.01)

(58) Field of Classification Search
CPC ............................ G06F 12/0246; G06F 9/3802
USPC .......................................... 711/103; 712/207
See application file for complete search history.

(56) References Cited

U.S. PATENT DOCUMENTS

| | | | |
|---|---|---|---|
| 5,809,515 A | 9/1998 | Kaki et al. | |
| 7,249,223 B2 * | 7/2007 | Moyer | G06F 12/0215 711/103 |
| 8,244,963 B2 | 8/2012 | Yeh | |
| 8,407,407 B1 | 3/2013 | Adler et al. | |

(Continued)

FOREIGN PATENT DOCUMENTS

| | | |
|---|---|---|
| CN | 101034382 | 9/2007 |
| CN | 102483952 | 5/2012 |

(Continued)

*Primary Examiner* — Prasith Thammavong
*Assistant Examiner* — Edmund Kwong
(74) *Attorney, Agent, or Firm* — McClure, Qualey & Rodack, LLP

(57) ABSTRACT

A data storage device is provided. The data storage device, coupled to a host, includes: a flash memory; and a controller, configured to control accessing of the flash memory; wherein when the host performs random data accessing to the flash memory, the controller retrieves address information of a corresponding block and a corresponding page in the flash memory associated with first data to be read based on a global mapping table, and pre-fetches the corresponding page from the flash memory based on the address information; wherein when the controller obtains the address information, the controller further determines whether the first data is located in a current buffer block based on a local mapping table; wherein when the first data is located in the current buffer block, the controller further cancels the pre-fetched corresponding page, and reads the first data from the current buffer block.

8 Claims, 2 Drawing Sheets

(56) References Cited

U.S. PATENT DOCUMENTS

| | | | |
|---|---|---|---|
| 8,959,307 B1* | 2/2015 | Bruce | G06F 12/0246 |
| | | | 711/103 |
| 8,996,784 B2 | 3/2015 | Tsai et al. | |
| 2003/0204675 A1* | 10/2003 | Dover | G06F 12/0862 |
| | | | 711/137 |
| 2006/0047914 A1* | 3/2006 | Hofmann | G06F 9/383 |
| | | | 711/137 |
| 2009/0077304 A1* | 3/2009 | Hong | G06F 12/0862 |
| | | | 711/103 |
| 2010/0082890 A1* | 4/2010 | Heo | G06F 12/0246 |
| | | | 711/103 |
| 2010/0235570 A1* | 9/2010 | Tsai | G06F 12/0862 |
| | | | 711/103 |
| 2011/0264864 A1* | 10/2011 | Kadambi | G06F 12/0862 |
| | | | 711/137 |
| 2012/0268994 A1* | 10/2012 | Nagashima | G06F 11/1048 |
| | | | 365/185.11 |
| 2013/0054877 A1* | 2/2013 | Yeh | G06F 12/0246 |
| | | | 711/103 |
| 2013/0124794 A1* | 5/2013 | Bux | G06F 12/0246 |
| | | | 711/103 |
| 2015/0138888 A1 | 5/2015 | Nagashima | |

FOREIGN PATENT DOCUMENTS

| | | |
|---|---|---|
| TW | 589536 | 6/2004 |
| TW | 201107971 A | 3/2011 |

\* cited by examiner

DATA STORAGE DEVICE AND DATA FETCHING METHOD FOR FLASH MEMORY

CROSS REFERENCE TO RELATED APPLICATIONS

This application claims the benefit of U.S. Provisional Application No. 61/837,515, filed Jun. 20, 2013, the entirety of which is incorporated by reference herein This Application claims priority of Taiwan Patent Application No. 103117734, filed on May 21, 2014, the entirety of which is incorporated by reference herein.

BACKGROUND OF THE INVENTION

Field of the Invention

The present invention relates to a flash memory, and in particular, to a data storage device including a flash memory and data fetching method of a flash memory.

Description of the Related Art

Flash memory is a common non-volatile data storage device, which can be erased and programmed electrically. For example, a NAND flash memory is usually for use in a memory card, a USB flash device, a solid-state disk (SSD), an embedded multimedia card, etc.

The storage array in a flash memory (e.g. NAND flash) includes multiple blocks, such as spare blocks and data blocks. Each block includes multiple pages. When some data are written into the flash memory, the intermediate data may be temporarily stored in a current buffer block of the spare blocks. When all pages in the current buffer block are written with data, the current buffer block may become a data block. When performing random accessing of the flash memory, some data may be still stored in the current buffer block. However, a conventional flash memory controller usually determines whether the data to be accessed is located in the current buffer block or in the data blocks, resulting in performance loss.

BRIEF SUMMARY OF THE INVENTION

A detailed description is given in the following embodiments with reference to the accompanying drawings.

In an exemplary embodiment, a data storage device is provided. The data storage device, coupled to a host, includes: a flash memory; and a controller, configured to control accessing of the flash memory; wherein when the host performs random data accessing to the flash memory, the controller retrieves address information for a corresponding block and a corresponding page in the flash memory associated with first data to be read based on a global mapping table, and pre-fetches the corresponding page from the flash memory based on the address information; wherein when the controller obtains the address information, the controller further determines whether the first data is located in a current buffer block based on a local mapping table; wherein when the first data is located in the current buffer block, the controller further cancels the pre-fetched corresponding page, and read the first data from the current buffer block.

In another exemplary embodiment, a data fetching method for a flash memory is provided. The method is for use in a data storage device coupled to a host, wherein the data storage device comprises a flash memory and a controller. The data fetching method includes the steps of: retrieving address information of a corresponding block and a corresponding page in the flash memory associated with first data to be read based on a global mapping table of the controller, and pre-fetching the corresponding page from the flash memory based on the address information when the host performs random data accessing to the flash memory; determining whether the first data to be read is located in a current buffer block based on a local mapping table of the controller when the controller obtains the address information; and cancelling the pre-fetched corresponding page, and reading the first data from the current buffer block when the first data is located in the current buffer block.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
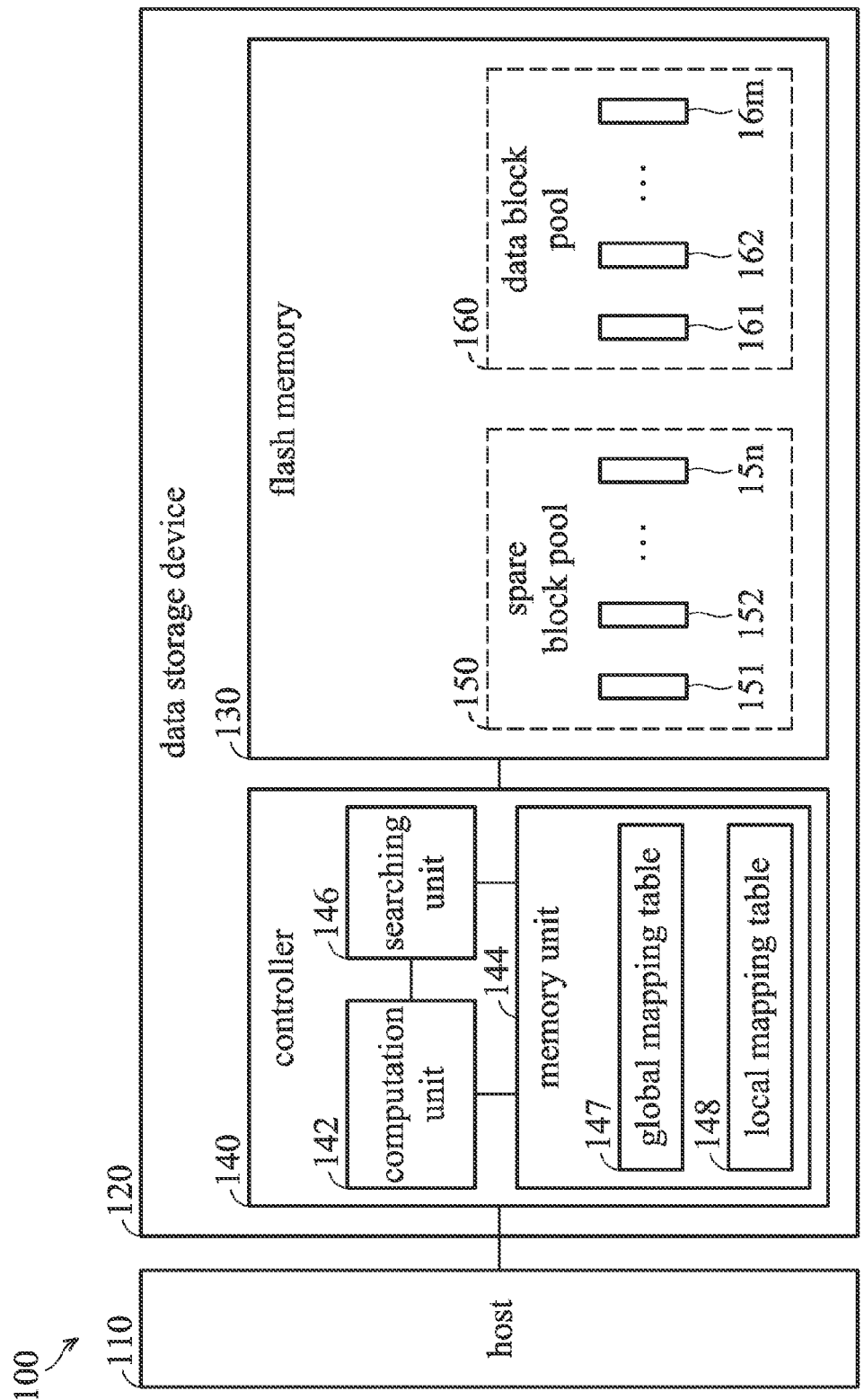
FIG. 1 is a block diagram of an electronic system in accordance with an embodiment of the invention.

FIG. 1 is a block diagram of an electronic system in accordance with an embodiment of the invention. The electronic system 100 may comprise a host 110 and a data storage device 120. The data storage device 120 may comprise a flash memory 130 and a controller 140, wherein the data storage device 120 is operated based on the instructions/commands from the host 110. The controller 140 may comprise a computation unit 142 and a memory unit (e.g. read-only memory, random access memory, registers) 144. The program codes and data stored in the memory unit 144 may be firmware executed by the computation unit 142, so that the controller 140 may control the flash memory 130 based on the firmware. The flash memory 130 may comprise a plurality of blocks, and each block comprises a plurality of pages.

In an embodiment, the flash memory 130 may comprise a spare block pool 150, and a data block pool 160. The spare block pool 150 comprises a plurality of spare blocks 151~15n for storing invalid data. The data block pool 160 comprise a plurality of data blocks 161~16m for storing data. In an embodiment, the controller 140 may manage the blocks of the flash memory 130 according to the commands from the host 110. A block in the flash memory 130 is assigned based on a physical address, and the host 110 may assign a block based on a logical address. Accordingly, the controller 140 has to convert the logical address from the host 110 to a physical address. In an embodiment, the controller 140 may record the relationship between the logical addresses and physical addresses into an address link table. In an embodiment, the controller 140 records the relationship between the logical addresses and physical addresses into at least one address link table such as a global mapping table 147 and a local mapping table 148. For example, the global mapping table 147 is a host-to-flash table, and the local mapping table 148 is a flash-to-host table. In an embodiment, the global mapping table 147 and the local mapping table 148 are stored in the flash memory 130.

In an embodiment, each of the data blocks 161~16m may comprise a plurality of pages. When data is stored in a page of the data blocks, the page can be regarded as a data page. When the page has a corresponding logical address, the page can be regarded as a valid page. In an embodiment, the global mapping table 147 records the physical address of the data from the host 110 in the flash memory 130. The local mapping table 148 records the data pages from the host 110 in the current buffer block of the flash memory 130. Generally, the number of links stored in the global mapping table 147 is much larger than that stored in the local mapping table 148.

When all pages in the current buffer block are written with data from the host 110, the current buffer block becomes a data block, and the relationship between the logical address and physical address of the data block is written into the global mapping table 147.

In an embodiment, when the host 110 writes data to the flash memory 130, the controller 140 may correctly write data into the current buffer block of the flash memory based on the global mapping table 147, and update the status of the data pages of the current buffer block of the flash memory 130 in the local mapping table 148. Specifically, when all pages in the current buffer block are written with data from the host 110, the controller 140 may set the current buffer block as a data block, and update the link relationship of data blocks in the global mapping table 147, and flush the local mapping table 148 storing the previous current buffer block.

In an embodiment, the controller 140 may further comprise a searching unit 146, configured to check the addresses recorded in the local mapping table 148 one by one, thereby determining whether the data to be accessed is located in the current buffer block. When the computation unit 142 performs random data accessing, the controller 140 may read the local mapping table 148 to determine whether the data to be accessed is located in the current buffer block. If so, the controller 140 may retrieve the data from the current buffer block directly. If not, the controller 140 may retrieve the physical address of the data in the flash memory 130 (e.g. page B of block B) from the global mapping table 147, and then read the data from the retrieved physical address of the flash memory 130. It should be noted that the controller has to deliver a read command from the host 110 to the flash memory 130 before the controller 140 queries the physical address from the global mapping table 147, and the controller 140 has to wait for a busy time before the flash memory 130 is ready for accessing. If the data to be read by the host 110 cannot be obtained by querying the local mapping table 148, the controller 140 has to send a read command and wait for the flash memory 130 to be ready for accessing.

In another embodiment, when the CPU or hardware of the host 110 is to perform random data accessing, the computation unit 142 of the controller 140 may directly pre-fetch data from the flash memory 130 based on the link relationship of the global mapping table 147 (e.g. directly read page B of block B), and the searching unit 146 may check the address data of the local mapping table 148 to determine whether the data of the host page to be read is located in the current buffer block. If so, the controller may cancel the pre-fetched data, and the computation unit 142 may send a read command again to retrieve the correct data from the current buffer block. If not, the controller 140 may obtain the desired data from the pre-fetched data (e.g. page B of block B). In the embodiment, the operations for pre-fetching from the flash memory 130 and checking address data in the local mapping table 148 can be performed almost simultaneously. Compared with the previous embodiment, in which these two operations can only be performed sequentially, the computation time can be significantly reduced when performing random accessing of the flash memory. It should be noted that, the order of these two operations for pre-fetching from the flash memory 130 and checking address data in the local mapping table 148 can be exchanged because these two operations are performed almost simultaneously. Accordingly, these two operations can be performed in parallel to reduce the computation time when performing random accessing to the flash memory 130.

Figure 2:
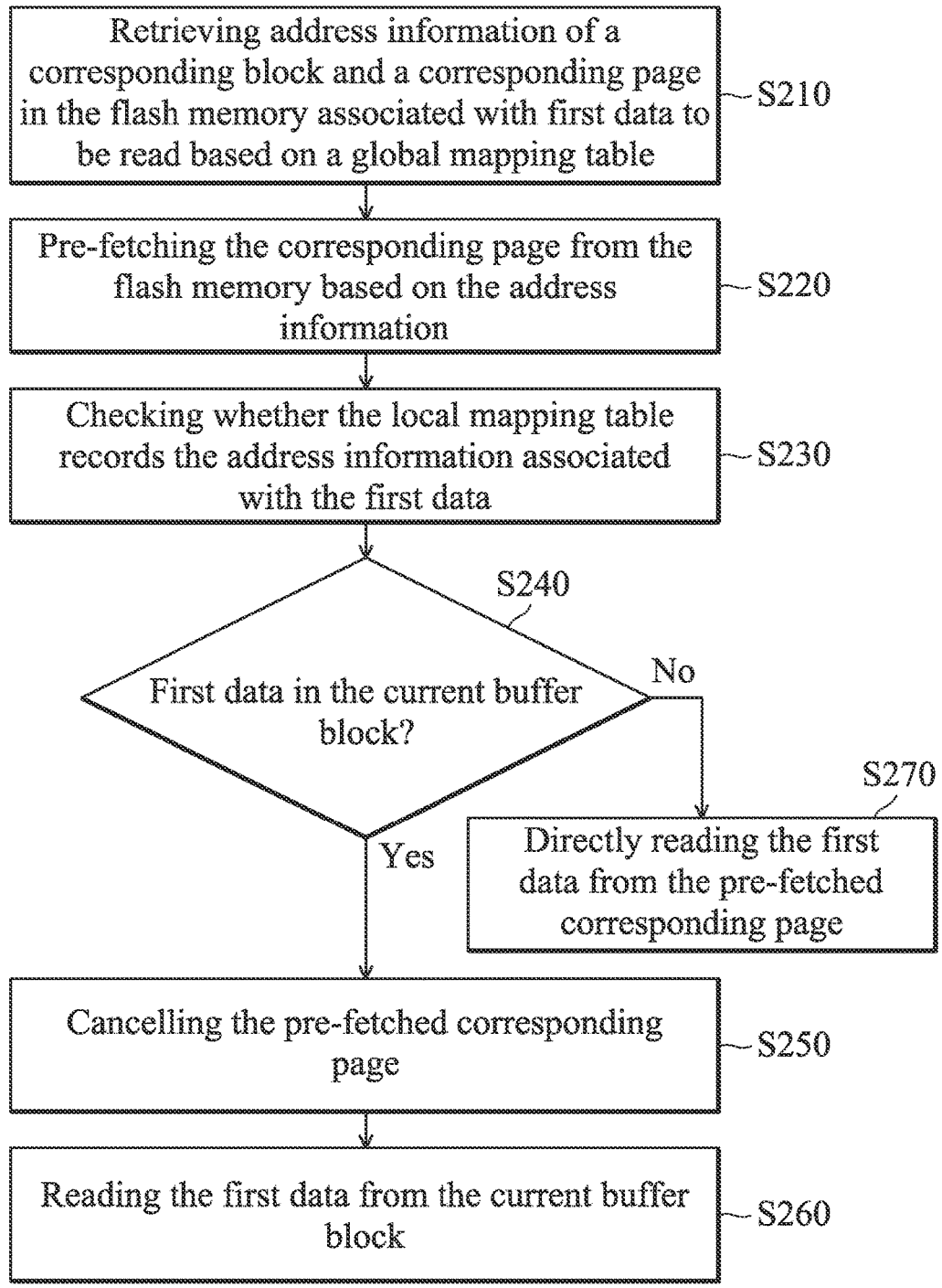
FIG. 2 is a flow chart of a data fetching method for use in a flash memory in accordance with an embodiment of the invention.

FIG. 2 is a flow chart of a data fetching method for use in a flash memory in accordance with an embodiment of the invention. As illustrated in FIG. 2, the computation unit 142 of the controller 140 may retrieve the address information of a corresponding block and a corresponding page in the flash memory 130 associated with the first data (step S210), and pre-fetch the corresponding page of the first data from the flash memory 130 based on the address information (e.g. the data is read to a read-out cache buffer of the controller 140 (not shown) (step S220). Subsequently, the searching unit 146 of the controller 140 may check whether the local mapping table 148 records the address information associated with the first data (step S230), and determine whether the first data to be read is located in a current buffer block of the flash memory 130 (step S240). If so, the computation unit 142 of the controller 140 may cancel the pre-fetched corresponding page (step S250), and read the first data from the current buffer block (step S260). If not, the computation unit 142 of the controller 140 may directly read the first data from the pre-fetched corresponding page (step S270).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, coupled to a host, the data storage device comprising:
   a flash memory; and
   a controller, configured to control accessing of the flash memory;
   wherein when the host performs random data accessing of the flash memory, the controller retrieves address information of a corresponding block and a corresponding page in the flash memory associated with first data to be read based on a global mapping table of the controller, and pre-fetches the corresponding page from the flash memory based on the address information;
   wherein after the controller retrieves the address information, the controller further determines whether the first data to be read is located in a current buffer block of the flash memory based on a local mapping table of the controller while the controller is pre-fetching the corresponding page from the memory based on the address information;
   wherein the pre-fetched corresponding page is stored in a buffer of the controller, wherein when the first data is located in the current buffer block, the controller directly reads the first data from the current buffer block, and wherein when the first data is not located in the current buffer block, the controller directly obtains the first data from the pre-fetched corresponding page stored in the buffer of the controller.

2. The data storage device as claimed in claim 1, wherein the global mapping table records mapping relationships from a logical address to a physical address between the host and the flash memory, and the local mapping table records a status of data pages from the host in the current buffer block.

3. The data storage device as claimed in claim 1, wherein the controller further comprises:

a computation unit, configured to retrieve the address information of the first data from the global mapping table; and a searching circuit, configured to check whether the local mapping table records the address information associated with the first data, thereby determining whether the first data is located in the current buffer block.

4. The data storage device as claimed in claim 1, wherein when the first data is located in the current buffer block, the controller further sends a read command to the flash memory, thereby reading the first data from the current buffer block.

5. A data fetching method for a flash memory, for use in a data storage device coupled to a host, wherein the data storage device comprises a flash memory and a controller, the data fetching method comprising:

retrieving address information of a corresponding block and a corresponding page in the flash memory associated with first data to be read based on a global mapping table of the controller, and pre-fetching the corresponding page from the flash memory based on the address information when the host performs random data accessing to the flash memory, wherein the pre-fetched corresponding page is stored in a buffer of the controller;

determining whether the first data to be read is located in a current buffer block of the flash memory based on a local mapping table of the controller while the controller is pre-fetching the corresponding page from the memory based on the address information after the controller retrieves the address information; and directly reading the first data from the current buffer block when the first data is located in the current buffer block, and directly obtaining the first data from the pre-fetched corresponding page stored in the buffer of the controller when the first data is not located in the current buffer block.

6. The method as claimed in claim 5, wherein the global mapping table records mapping relationship from a logical address to a physical address between the host and the flash memory, and the local mapping table records a status of data pages from the host in the current buffer block.

7. The method as claimed in claim 5, wherein the controller further comprises:

a computation unit, configured to retrieve the address information of the first data from the global mapping table; and a searching circuit, configured to check whether the local mapping table records the address information associated with the first data, thereby determining whether the first data is located in the current buffer block.

8. The method as claimed in claim 5, further comprising:

sending a read command to the flash memory by the controller to read the first data from the current buffer block when the first data is located in the current buffer block.

* * * * *